United States Patent [19]

Pierret et al.

[11] Patent Number: 5,245,267

[45] Date of Patent: Sep. 14, 1993

[54] INDICATING MEANS IN A DOUBLE VOLTAGE MOTOR VEHICLE ELECTRICAL CIRCUIT

[75] Inventors: Jean-Marie Pierret; Pierre Perrier, both of Paris; Frederic Brandy, Gentilly, all of France

[73] Assignee: Valeo Equipements Electriques Moteur, Creteil, France

[21] Appl. No.: 865,321

[22] Filed: Apr. 8, 1992

[30] Foreign Application Priority Data

Apr. 19, 1991 [FR] France .................. 91 04854

[51] Int. Cl.⁵ .............................................. H02J 7/14
[52] U.S. Cl. ........................................ 320/15; 320/48; 320/64; 322/99
[58] Field of Search .......... 322/28, 27, 90, 99; 320/6, 7, 15, 17, 64, 68, 48; 307/16

[56] References Cited

U.S. PATENT DOCUMENTS

| | | | |
|---|---|---|---|
| 4,041,369 | 8/1977 | King et al. | 322/99 |
| 4,316,134 | 2/1982 | Balan et al. | 322/99 |
| 4,336,485 | 6/1982 | Stroud | 320/15 |
| 4,604,565 | 8/1986 | Yokota et al. | 320/15 |

FOREIGN PATENT DOCUMENTS 0857585 12/1977 Belgium .
0018836 5/1980 European Pat. Off. .
2101270 1/1971 Fed. Rep. of Germany .

Primary Examiner—Kristine L. Peckman
Attorney, Agent, or Firm—Morgan & Finnegan

[57] ABSTRACT

A double voltage alternator circuit having two alternators, each associated with one of two batteries connected in series, and two alternator excitation current control circuits each of which receives a d.c. voltage from an auxiliary rectifier bridge associated with the corresponding alternator, also has a single warning lamp connected between that terminal of a first one of the batteries which is not directly connected in series to the other battery and (a) the auxiliary rectifier bridge associated with that other battery, through an avalanche diode which enables current to pass through the lamp when the voltage at its terminals is greater than a predetermined value, and (b) to the auxiliary rectifier bridge associated with the first battery, through a unidirectional circuit element such as a diode which prevents current from flowing between the two auxiliary rectifier bridges. The invention enables fault indication in a double voltage circuit to be given using a single lamp.

5 Claims, 1 Drawing Sheet

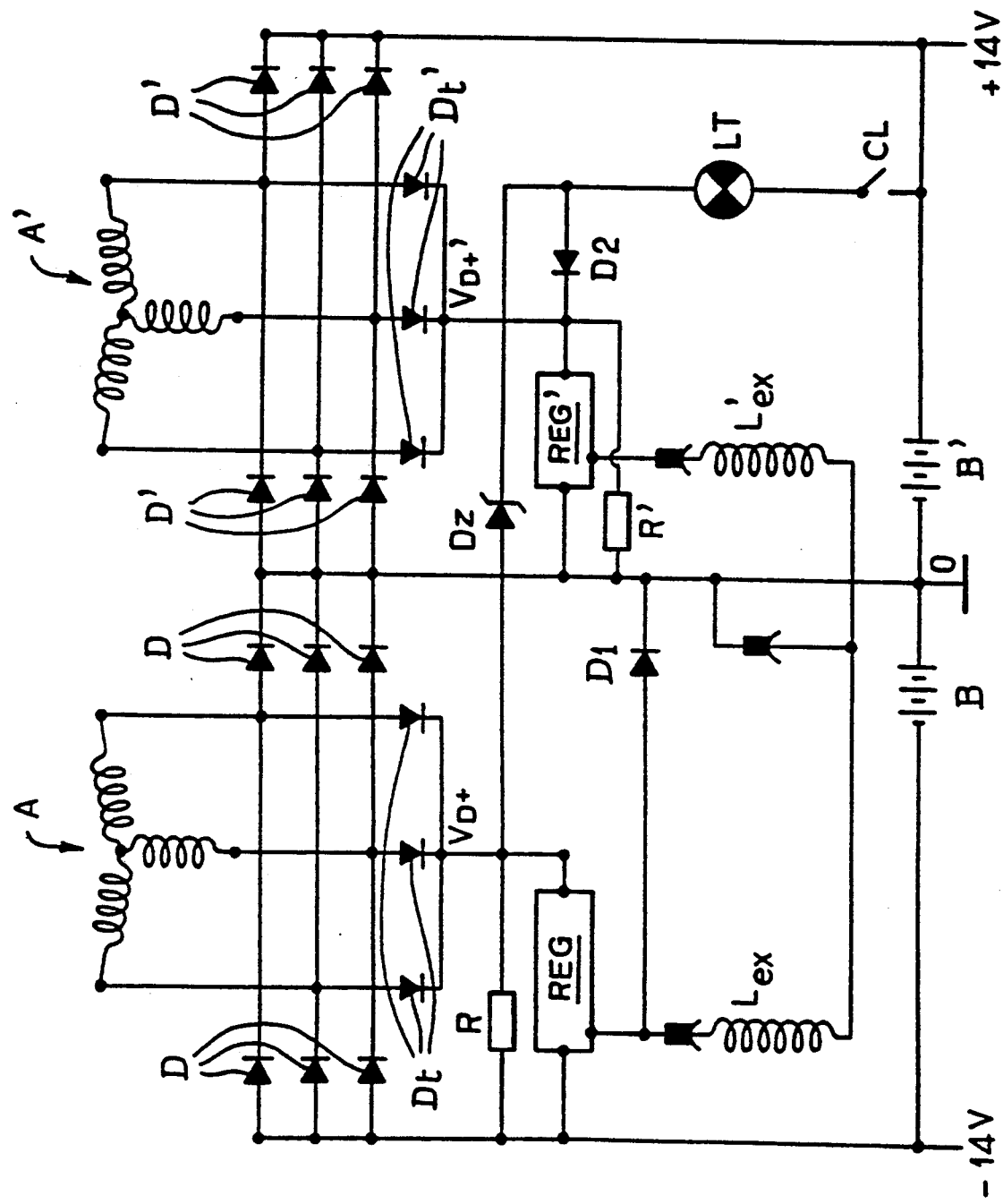

INDICATING MEANS IN A DOUBLE VOLTAGE MOTOR VEHICLE ELECTRICAL CIRCUIT

FIELD OF THE INVENTION

The present invention is generally concerned with alternating circuits for charging batteries in motor vehicles.

BACKGROUND OF THE INVENTION

It is well known to provide in such an alternator circuit a warning lamp which is arranged on the fascia, i.e., the dashboard of the vehicle for indicating in particular a fault in the auto-excitation of the alternator. The lamp is conventionally connected between the voltage $V_{D+}$ which is delivered by the auxiliary rectifier bridge (three diodes) of the alternator, and the voltage $V_{B+}$ at the positive terminal of the battery. It is extinguished only when these voltages are approximately equal.

There is at the present time an increasing tendency to use for motor vehicles a double electrical network comprising two alternators associated with two batteries. Such a double voltage network has a number of advantages. Firstly, the various items of electrical equipment on the vehicle demand a large consumption of power, and by doubling the supply voltage available—the double voltage network is capable of delivering 28 volts, for example, between two of its terminals instead of the usual 14 volts—the double voltage circuit enables the current which is used to be essentially divided between the two alternators and batteries, which enables electrical conductors to be used which are of smaller cross section and therefore cheaper.

In addition, in connection with the supply of electric motors of the kind which require to be reversed, the associated switching means are simplified by virtue of the availability of two voltages, namely $\pm 14$ volts.

Finally, where the vehicle has headlamps equipped with discharge lamps, the high tension supply circuit for these lamps can be derived from a d.c. voltage which is twice as large as in conventional systems. Accordingly, certain components, and in particular the step-up voltage transformer which is usually provided in such circuits, may be selected so as to be of reduced size and cost.

An immediate approach, as far as fault indication in such a double voltage network is concerned, is to provide two warning lamps, associated respectively with the two alternator circuits. However, it is undesirable difficult or both to locate two lamps on the dashboard, either for reasons of selling price or because there is not room for them.

DISCUSSION OF THE INVENTION

An object of the present invention is to provide a circuit in which only a single warning lamp is used, common to both of the two alternator circuits, while at the same time avoiding increasing the complication or cost of the circuits to any significant extent.

According to the invention, a double voltage alternator circuit, of the kind comprising two alternators which are associated respectively with two batteries mounted in series with each other, and two control means for the excitation current of the alternators each of which receives a d.c. voltage from an auxiliary rectifier bridge associated with each alternator, is characterised in that it has only one warning lamp, which is connected on one side to a terminal of a first battery connected in opposition to the other battery, being connected on the other side, firstly to the auxiliary rectifier bridge of the said other battery through a voltage changing means such as to be capable of allowing a current to pass through the lamp when the voltage at its terminals is greater than a predetermined value, and secondly to the auxiliary rectifier bridge of the said first battery through a uni-directional conduction means which prevents current from flowing from one auxiliary rectifier bridge to the other.

Further aspects, objects and advantages of the present invention will appear more clearly from a reading of the detailed description of a preferred embodiment of the invention, which is given below by way of non-limiting example only and with reference to the accompanying drawing.

BRIEF DESCRIPTION OF THE DRAWING

The single FIGURE of the drawing is a general diagram of a double voltage circuit, or dual alternator circuit, in accordance with the present invention.

DESCRIPTION OF A PREFERRED EMBODIMENT OF THE INVENTION

The FIGURE shows a double voltage or dual alternator circuit which comprises a pair of three-phase alternators A and A', associated with two batteries B and B' respectively. The positive pole of the battery B is connected to the negative pole of the battery B', this connection being grounded. There is thus a voltage $\pm V$ with respect to ground, while between the negative terminal of the battery B and the positive terminal of the battery B' there is a voltage of 2V, with for example $V = 14$ volts (or slightly less, depending on the state of charge of the batteries).

With each of the two alternators A and A', it is conventional to associate a main rectifier bridge (diodes D and D' respectively) and an auxiliary rectifier bridge (three diodes Dt and three diodes D$_t$', respectively). The output potentials of the auxiliary bridges are indicated at $V_{D+}$ and $V_{d+}'$ respectively.

The alternator A is equipped with a regulator circuit REG, which is connected between the output of its auxiliary bridge and a first terminal of an excitation winding $L_{ex}$ of the alternator A, and is also connected to the negative terminal of the battery B. The second terminal of the excitation winding $L_{ex}$ is connected to the positive terminal of the battery B, that is to say to ground. A resistor R is provided between the common points of the three diodes Dt and the negative terminal of the battery B. A diode D1 is connected in the direction from the first terminal of the excitation winding $L_{ex}$ and ground.

The alternator A' is equipped with a regulating circuit REG', which is connected to its auxiliary bridge, to ground, and to a first terminal of the excitation winding $L'_{ex}$ of the alternator A'. The second terminal of this excitation winding is grounded. A resistor R' is connected between the common point of the three diodes Dt' and ground.

An ignition switch (typically a key) CL, indicated in the drawing in the form of an interruptor, is connected between the positive terminal of the battery B' and the first terminal of a warning lamp LT. An avalanche or Zener diode Dz, having an appropriate avalanche voltage, is connected in the direction going from the output of the auxiliary bridge of the first alternator A to the second terminal of the warning lamp LT. Finally, a diode D2 is connected in the direction going from the second terminal of the warning lamp LT to the output of the auxiliary bridge of the second alternator A'. The avalanche voltage of the diode Dz is selected so as to be approximately equal to the voltage V, i.e. in the present example is about 14 volts. The diode D2 is an ordinary diode having a minimal direct voltage drop. The diode D1 is a free wheel diode associated with the inductive winding $L_{ex}$.

The operation of the system described above will now be explained. Throughout this explanation, the values of voltage indicated are given with respect to ground.

When the key CL is closed and the second alternator A' is no longer energised, the voltage $V'_{D+}$ is not fixed, and the regulator REG' is in a "full field" state, that is to say its power transistor, which supplies the winding $L_{ex}$, is totally conducting, which signifies a slightly resistive connection between the output of the auxiliary bridge of the alternator A' and the first terminal of the excitation winding $L'_{ex}$. A current is thus able to flow to ground from the positive terminal of the battery B', through the key CL, the lamp LT, the diode D2, the regulating circuit REG', and the excitation winding $L'_{ex}$. Since this current passes through the lamp LT, the latter is therefore lit.

When the electrical connection between the regulator REG' and the excitation winding $L'_{ex}$ is broken, or if it is broken at the level of the power transistor of the regulating circuit REG', a current will still circulate through the key CL, lamp LT, diode D2 and resistor R', even though the lamp will still be lit (though it may glow more dimly). In this way, an indication of the fault is given.

It will be noted that in the situation described above (i.e. with the key closed and the alternator A' not energised), then if the alternator A is energised, the potential $V_{D+}$ is greater by about 14 volts than the potential of minus 14 volts which is present on the negative terminal of the battery B and is thus about zero volts. Since the avalanche voltage of the Zener diode Dz is about 14 volts, it follows that substantially no current flows in the latter. In the case in which the alternator A is not energised while the alternator A' is energised, the potential $V_{D+}$ is not fixed, and a voltage greater than the avalanche voltage of the Zener diode then tends to exist at the terminals of the latter. This voltage is of the order of 28 volts. The Zener diode is thus rendered conducting, so that a current is able to circulate through the key CL, the lamp LT, the Zener diode Dz and the resistor R (and possibly also through the regulating circuit REG in parallel with the resistor R), so that the lamp LT is lit. It should be noted that in this case, the lamp is supplied with a voltage of about 14 volts, due to the fact that the Zener diode Dz absorbs about one half of the voltage of 28 volts between the ends of the path of the current described above.

The purpose of the diode D2 is to prevent any current from flowing in the Zener diode Dz from the auxiliary bridge of the alternator A' when the latter is energised.

In the situation in which neither of the two alternators is energised, the lamp LT will then be lit by a current which flows either along the path defined by the key CL, lamp LT, diode D2, regulating circuit REG', excitation winding $L'_{ex}$ (or resistor R'); or in the path defined by the key CL, lamp LT, Zener diode Dz, resistor R (or regulating circuit REG), excitation winding $L_{ex}$ (or resistor R); or along both these paths. If the current flows partly along one path and partly along the other, the distribution of the current between the two paths depends essentially on the characteristics of the power stages of the two regulating circuits REG and REG', the Zener diode Dz and the two batteries B and B'.

Similarly, the lamp LT is lit when there is insufficient excitation of one or other of the two alternators, or where there is simply an interruption in the excitation circuit.

Considering now the case in which both alternators are operating normally, the voltage $V_{D+}$ exceeds by about +14 volts the voltage of −14 volts present on the negative terminal of the battery B, and is thus about zero. The voltage on the anode of the Zener diode Dz (at the right in the drawing) is greater than this voltage by a value which is equal to its avalanche voltage, and thus becomes about +14 volts. The voltage $V'_{D+}$ then becomes equal to about +14 volts. The potential of the second terminal of the warning lamp LT is thus in all cases close to +14 volts, and the lamp has a voltage difference between its terminals which is approximately zero, so that the lamp is now extinguished.

The lamp LT is thus capable of indicating, by becoming illuminated, a lack of excitation or a fault in one or other of the alternator circuits, while it is extinguished only if both alternator circuits are operating correctly.

The present invention is of course in no way limited to the embodiment described above and shown in the drawing, and the person skilled in the art will be able to apply to it any variation or modification that falls within the spirit of the invention. In particular, the invention is not only applicable to symmetrical double voltage networks, but it may also be applied to double voltage networks having two batteries of different voltages. There may for example be one battery of 14 volts and another of 28 volts; or one of 14 volts and one of 42 volts. In such a case, in order to obtain the method of operation described above, it is only necessary to make any required modifications to the avalanche voltage of the diode Dz, which should be about equal to the nominal voltage of the battery B'. In addition, the avalanche or Zener diode Dz may be replaced by any suitable equivalent voltage changing means.

What is claimed is:

1. A double voltage alternator circuit comprising a first alternator, a second alternator, a first battery, a second battery in series with the first battery, the first and second batteries being associated respectively with the first and second alternators, first and second excitation current control means associated with the first and second alternators respectively, a first auxiliary rectifier bridge and a second auxiliary rectifier bridge associated respectively with the first and second alternators for supplying a d.c. excitation voltage to the corresponding alternator, and a single warning lamp of the circuit, the first battery having first and second terminals with the second terminal being connected to the second battery, the warning lamp being connected between said first terminal and the second auxiliary rectifier bridge, the circuit further including voltage changing means connected between the warning lamp and the second auxiliary rectifier bridge and being such as to allow a current to pass through the warning lamp when the voltage across the voltage changing means is greater than a predetermined value, the warning lamp being further connected between said first terminal of the first battery and the first auxiliary rectifier bridge, with the circuit further including uni-directional conduction means connected between the warning lamp and the first auxiliary rectifier bridge whereby to prevent current flowing between the auxiliary rectifier bridges.

2. A circuit according to claim 1, wherein the voltage changing means is an avalanche or Zener diode.

3. A circuit according to claim 2, wherein said avalanche diode has an avalanche voltage constituting said predetermined value, said value being about equal to the nominal voltage of the first battery.

4. A circuit according to claim 1, wherein the uni-directional conduction means is a diode.

5. A circuit according to claim 1, further including resistors connected in parallel with said excitation current control means.

* * * * *